United States Patent [19]
Weinblatt

[11] Patent Number: 4,574,314
[45] Date of Patent: Mar. 4, 1986

[54] CAMERA AUTOFOCUS TECHNIQUE

[76] Inventor: Lee S. Weinblatt, 797 Winthrop Rd., Teaneck, N.J. 07666

[21] Appl. No.: 594,221

[22] Filed: Mar. 28, 1984

Related U.S. Application Data

[63] Continuation-in-part of Ser. No. 383,282, May 28, 1982, abandoned.

[51] Int. Cl.$^4$ ............................................. H04N 5/232
[52] U.S. Cl. ..................................... 358/227; 354/400
[58] Field of Search ............... 358/227, 226, 228, 250, 358/55, 93, 103, 107, 108; 354/195.1, 199, 400, 402, 403, 409

[56] References Cited

U.S. PATENT DOCUMENTS

| | | | |
|---|---|---|---|
| 3,542,457 | 11/1970 | Balding | 358/93 |
| 3,699,248 | 10/1972 | Mckechnie | 358/227 |
| 3,923,370 | 12/1975 | Mostrom | 358/250 |
| 4,019,813 | 4/1977 | Cornsweet | 358/107 |
| 4,034,401 | 7/1977 | Mann | 358/93 |

OTHER PUBLICATIONS

Methods and Designs–Survey of Eye Movement Recording Methods, by Young and Sheena, Behavior Research Methods & Instrumentation, 1975 vol. 7(5), pp. 394-429.

*Primary Examiner*—Tommy P. Chin
*Attorney, Agent, or Firm*—Thomas Langer

[57] ABSTRACT

An autofocus system is provided for facilitating the focusing of a camera. An autofocus device is tiltably mounted on the camera body. Its position is controlled by an eye-movement-monitoring apparatus responsive to movements of the cameraman's eyes. As the cameraman shifts the position of his eyes, the autofocus device is controlled to move accordingly so it is aimed at the same portion of the scene viewed by the cameraman. The autofocus device then suitably controls the lens focus.

10 Claims, 2 Drawing Figures

CAMERA AUTOFOCUS TECHNIQUE

This application is a continuation-in-part of U.S. application Ser. No. 383,282 filed May 18, 1982, now abandoned.

BACKGROUND OF THE INVENTION

This invention is directed to an autofocus system for focusing a camera, and in particular to such a system for use on studio television cameras.

A typical television camera now in general usage by television stations in their studios is shown in FIG. 1. The main constituents of camera 1 are lens 3, camera body 5 and monitor 7. Camera body 5 houses the sensors responsive to the image viewed through lens 3, as well as the necessary electronics to generate the electrical signals which are eventually transmitted to the public viewing audience. Monitor 7 which is mounted atop (as shown) or incorporated within (not shown) camera body 5, is a standard television set with a 5 inch screen 8 which displays the scene viewed through lens 3. It is, of course, suitably connected to camera body 5 which provides it with the signals required to produce the displayed image. The cameraman places his forehead against hood, or visor, 10 and peers at this monitor to aim and focus the camera. He aims it by maneuvering the camera until the scene of interest comes on screen 8. The cameraman focuses the camera by manually turning a focusing wheel (not shown) linked to the lens and which controls its setting. Hood 10 serves to shade screen 8 from the bright lights in the studio so that the displayed image is not washed out.

One problem with the just-described system lies in the manual focusing method. In order to minimize the manual focusing required as the camera is shifted in position from one scene to another, the studio must be bathed in intensely bright light to maximize the depth of field. This type of lighting also softens any focusing errors so they are not noticeable. However, such lighting conditions are uncomfortable because of the concomitant heat generated as well as the visual discomfort caused to people with sensitive eyes. Also, the need to focus manually in conditions of quickly shifting scenes puts a burden on the cameraman's capacity to operate the camera properly.

Despite the benefits of automating the focusing function, such as freeing the cameraman from that chore so he can better concentrate on other matters, only the small consumer-type cameras have been supplied with an autofocus system. The larger, more sophisticated cameras such as studio television cameras do not have this feature. It is felt this may be due to the relatively wide focusing field of view, such as 20 degrees, of such autofocus devices. An autofocus system will tend to focus on the most prominent object in its field of view. Since the field of view is so wide, it is likely in many instances that a misfocus will occur because the object of interest is not the one most prominent. Thus, despite its apparent advantages, an autofocus system in this environment is not practical.

SUMMARY OF THE INVENTION

Accordingly, a primary object of the invention is to automate the focusing of sophisticated cameras such as television cameras.

Another object of the invention is to provide an autofocus system for a television camera which automatically follows movement of the cameraman's eyes.

A further object of the invention is to provide an autofocus system with a narrowed field of view.

These and other objects are obtained in accordance with one aspect of the present invention by a camera having a camera body, a lens and an autofocus system for controlling the focus of said lens. The autofocus system includes eye-movement-monitoring means secured to the camera body for detecting the eye position of the cameraman as he views a certain scene to generate a signal representative of such eye position. An autofocus means is coupled to said lens for suitably focusing the lens. Means on the camera body is provided which is responsive to said eye-position signal for aiming said autofocus means in the direction looked at by the cameraman. To calibrate the autofocus system to the particular cameraman operating the camera a calibration means is coupled to said autofocus means and said eye-movement-monitoring means.

In order to enable the camera to focus on a relatively narrow portion of the scene within the field of view of the lens, the field of response of the autofocus device is narrowed by, for example, a tube affixed to its front. The autofocus system then acts to more accurately focus the system exactly on what the cameraman is looking at rather than at the most prominent object in its otherwise considerably wider field of view.

The autofocus device aiming means can be a servo mechanism responsive to the eye position signal generated by the eye-movement-monitoring means. It, in turn, operates a tilting mechanism to which the autofocus device is attached. The mechanism can, for example, have two degrees of freedom so it can tilt from side-to-side and up-down.

Another aspect of the present invention is a method of automatically focusing a camera comprising the steps of aiming the camera at a given scene; monitoring the eye position of the cameraman as he views a given portion of said scene; controlling an autofocus device so that it is aimed at said given portion of the scene; and controlling the lens focus with said autofocus device.

The method is thus dependent on the cameraman's eye movements thereby eliminating a manual chore. The cameraman is free to use his hands for other necessary tasks, such as maneuvering the camera and/or carrying or manipulating related equipment.

DETAILED DESCRIPTION OF THE DRAWINGS

Figure 1:
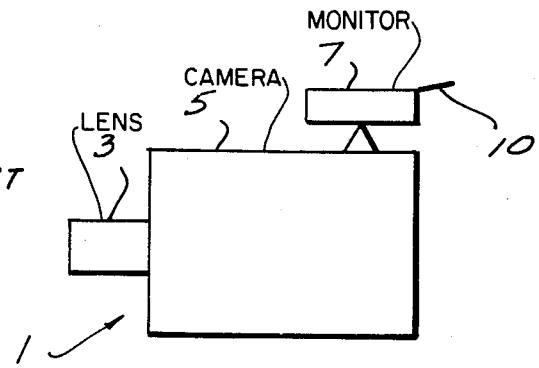
FIG. 1 depicts a prior art television studio camera.
Figure 2:
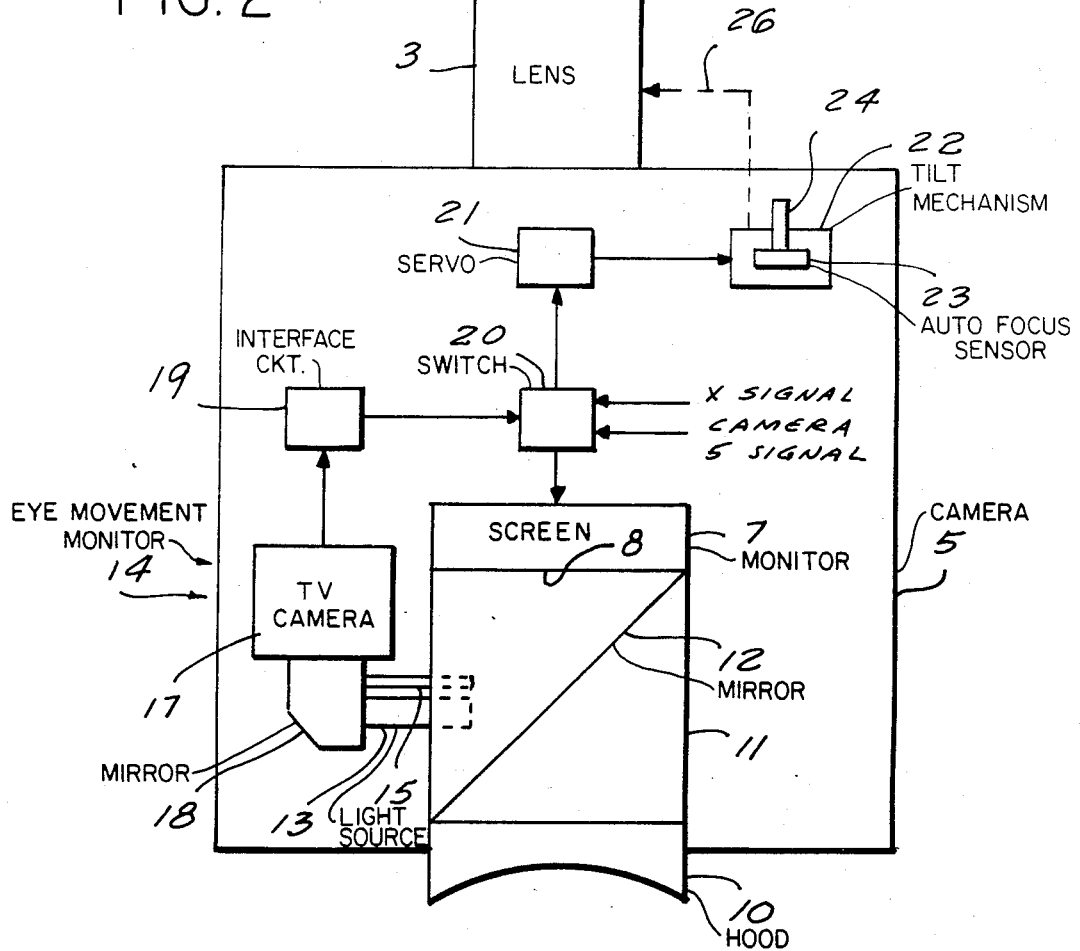
FIG. 2 depicts a plan view, partially in schematic, of an autofocusing system according to the invention.

FIG. 2 shows monitor 7 as viewed from above. For the sake of clarity. Lens 3 and camera body 5 are shown below it. Housing 11 is mounted on the rear portion of monitor 7 so that it is between screen 8 of monitor 7 and the cameraman's eye. Hood 10 is attached to the rear of housing 11. Hood 10 is arcuate in shape to receive the forehead of the cameraman. Housing 11 contains a semi-silvered mirror 12, itself well known, positioned so that the cameraman can see screen 8, but his eye movements in watching the screen are reflected into lens tube 13. Thus, mirror 12 passes light from screen 8 to the cameraman's eye and simultaneously reflects light bouncing off the cameraman's eye to lens tube 13.

Lens tube 13 is part of an eye movement monitoring apparatus 14 which utilizes the well known principle of corneal reflection. See the article "Methods and Designs, Survey of Eye Movement Recording Methods", by Young and Sheena appearing in Behavior Research Methods and Instrumentation 1975, Vol. 7(5), pgs. 397–429, and in particular pgs. 400 and 402. Apparatus 14 includes a small television camera 17, lens tube 13 connected to camera 17 by right angle mirror 18, and an infrared light source within elongated tube 15 mounted parallel to tube 13. Apparatus 14 is mounted on geared tracks (not shown) which enable movement in the X (right-left when viewing the drawing) and Y (in-out of the paper when viewing the drawing) directions. A suitable mechanism (not shown), such as toothed wheels rotatable by hand, are used to move apparatus 14 along the tracks for calibration of the apparatus, as discussed below.

Light source 15 emits a small dot of light which is reflected by mirror 12 unto the cornea of the cameraman. The latter, of course, has his head pressed tightly against hood 10 while viewing monitor 7. In this position, his head remains substantially fixed in place because forward movement is blocked by hood 10, sideways movement is limited by the arcuate shape of hood 10, and vertical movement is minimized by the setting of the equipment at a comfortable height as well as by friction between the forehead and hood 10. The dot of light bounces off the cameraman's cornea, at an angle dependent on his eye position, toward mirror 12 which, in turn reflects the dot into lens tube 13. The position of the dot detected by the tube 13 is transmitted via right angle mirror 18 into camera 17. Thus, camera 17 will sense a position which is representative of the portion of screen 8 at which the cameraman was looking.

Interface circuit 19 converts the position of the dot as sensed by camera 17 to correspond precisely to the point on the screen of monitor 7 viewed by the cameraman to allow, for example, for the several optical reflections between his eye and camera 17. One such circuit is provided by the Polymetric Company of North Wilmington, Mass. and is discussed on pg. 405 of the above-mentioned Young and Sheena article. The output of interface circuit 19 is input to a switch 20. One output from switch 20 is fed into servo mechanism 21 linked to tilting meachanism 22 for autofocus sensor 23. The signal from circuit 19 controls servo mechanism 21 which acts via tilting mechanism 22 to position sensor 23 so that it points exactly at the portion of the scene shown on the monitor screen at which the cameraman was looking. Thus, in a sense, the invention "connects" autofocus sensor 23 to the cameraman's eyes so that the two shift position together. Autofocus sensor 23 can be of a type now readily available, such as the sonar type now in usage, for example, on instant developing consumer cameras.

Switch 20 can be a mechanical contact or electronic switch. Its function is to couple the signal from interface circuit 19 to either monitor 7 or servo 21. It also connects the signal from camera 5 to monitor 7. When the system is being calibrated, as discussed below, switch 20 disconnects the signal from camera 5 to monitor 7 and routes the eye movement signal to monitor 7 so that the cameraman's eye movements are displayed thereon. In the meantime, no signal is being input to servo mechanism 21. When the calibration procedure is finished, switch 20 removes the eye movement signal from monitor 7, restores the signal from camera 5, and inputs the eye movement signal to servo mechanism 21.

Since the field of view of autofocus systems may exceed 20 degrees, as discussed above, they tend to focus on the most prominent object in the field of view. However, such object may not be what the cameraman wants to focus on. Thus, a problem may occur in focusing the camera properly, even if the sensor 23 is aimed exactly at the position in the scene looked at by the cameraman. To overcome this problem, a tube 24 is afixed in front of sensor 23. It is sized to narrow the field of response to as low as $\frac{1}{2}$ degree. The dimensions of such a tube will vary with the type of autofocus sensor selected. Such dimensions are readily ascertainable, and no further details are deemed necessary. With tube 24 in place, autofocus device will cause camera 1 to focus on precisely the object the cameraman wants to put into focus, rather than on a more prominent object within the normal field of view of the device.

Tilt mechanism 22 requires no detailed explanation. Suffice it to say that it can be a conventional mechanism permitting freedom of movement in two directions, up-down and side-to-side. Sensor 23 can thus be shifted in direction as necessary to follow movements of the cameraman's eyes.

Autofocus sensor 23 is coupled to lens 3 via link 26 which operates to actually focus the lens. The actual focusing mechanism is not shown and can, for example, be incorporated within camera body 5 or lens 3. Several types of such a focusing mechanism are known. Its details do not comprise any part of the invention, and therefore none are furnished. Sensor 23 generates a signal indicative of the required focus for the scene it detects through tube 23. The focusing signal from sensor 23 is transferred via link 30 to suitably change the focus.

In operation, the equipment is first calibrated by generating, for example, an X in the center of the monitor screen by conventional circuitry (not shown). The cameraman puts his head into position against hood 10, and the eye movement monitoring equipment is activated. Switch 20 is activated to remove the camera 5 signal from monitor 7 and the eye movement signal from servo mechanism 21 while applying to monitor 7 both the X generating signal and the eye movement signal. The cameraman then looks at the displayed X. The position of the dot shown on the screen from camera 17 should overlap the X. If it does not, the equipment 14 is moved on its tracks in the X and/or Y directions until overlap occurs. The equipment is thus calibrated. Switch 20 is then actuated to remove the X signal and eye movement signal from monitor 7, restore the camera 5 signal to monitor 7, and route the eye movement signal to servo mechanism 21. In this condition, the autofocus system is ready to perform properly.

As the camera 1 is kept steady, the cameraman may want to shift the focus from an object in the upper right hand of the screen 8 which is very close to the camera to another object far from the camera and which appears at the lower left portion of screen 8. All he need do is shift his eyes from the former to the latter. Eye movement apparatus will track the shift in eye position and generate a suitable signal via interface circuit 19 to servo mechanism 21. The servos will move tilt mechanism 22 accordingly, so that sensor 23 and tube 24 are aimed at the distant object. Link 26 will then operate to quickly refocus the camera lens 3 properly. It must be emphasized that the only action required of the cameraman is a mere shift of his eyes. Although some movement of the cameraman's head may occur because it is not rigidly secured in place, such movement will not be enough to unacceptably disturb the measurements. As mentioned above, head movement is restrained by hood 10. Furthermore, precision is not normally required for the anticipated utilization of this apparatus because relatively large objects would be focused on. The effect of such relatively slight head movement is, thus, negligible.

Although the preferred embodiment of the invention has been disclosed above, it must be recognized that various modifications are readily apparent. For example, various alternatives for interface circuit 19, switch 20, servo mechanism 21, tilt mechanism 22, autofocus sensor 23 and the actual focusing mechanism are available. Details have not been supplied in order not to obfuscate the invention. Moreover, choice of one determines any or all of the others. Also, one form of an eye movement monitoring apparatus has been shown. It is compact and effective, and is also currently available. However, substitution of another type of eye movement apparatus is possible.

I claim:

1. An autofocus system for use on a camera having a lens, said system comprising:
   eye movement monitoring means for detecting the rotational eye position of a cameraman as he views a certain scene to generate a signal representative of such eye position;
   autofocus means coupled to said lens for suitably focusing the lens;
   means responsive to said eye-position-representative signal for aiming said autofocus means in the direction looked at by the cameraman.

2. The autofocus system of claim 1 further comprising means mounted on said autofocus means to substantially narrow its field of response.

3. The autofocus system of claim 1 wherein said eye-movement-monitoring means comprising a light source, means for directing a dot of light from said light source at the cameraman's eye, a television camera, and means for directing said dot of light reflected from the cameraman's eye into said television camera.

4. The autofocus system of claim 1, wherein said aiming means comprises a servo mechanism electrically coupled to said eye-position signal, and a tilting mechanism to which said autofocus means is secured, said tilting mechanism being mechanically coupled to said servo mechanism.

5. A camera having a camera body, a lens and an autofocus system for controlling the focus of said lens, said autofocus system comprising:
   eye-movement-monitoring means secured to the camera body for detecting the rotational eye position of a cameraman as he views a certain scene to generate a signal representative of such eye position;
   autofocus means coupled to said lens for suitably focusing the lens;
   means on the camera body responsive to said eye-position signal for aiming said autofocus means in the direction looked at by the cameraman; and
   calibration means coupled to said autofocus means and said eye-movement-monitoring means to permit the cameramen to self-calibrate the autofocus system.

6. The camera of claim 5, further comprising means mounted on said autofocus means to substantially narrow its field of response.

7. The camera of claim 5, wherein said camera is a television camera, such as a studio camera, including a monitor for displaying the scene observed within the field of view of the lens, said eye-movement-monitoring means further comprising a half-silvered mirror secured between the monitor and the cameraman's eye, a second compact television camera, light source means aimed at said mirror for directing a dot of light at the cameraman's eye, and means for directing a dot of light reflected by the cameraman's eye into said second camera.

8. The camera of claim 7, wherein said calibration means comprises X-signal generating means for generating an X in the center of said monitor; switch means having its inputs coupled, respectively, to said X-signal generating means, a signal representative of the scene viewed by said lens, and the eye-movement-monitoring means, and having its output coupled to said monitor and said aiming means; said switch means normally passing the lens signal to the monitor and the eye-movement-monitoring signal to said aiming means, said switch means during calibration passing the X-signal and the eye-movement-monitoring signal to the monitor while blocking the remaining signals.

9. A method of automatically focusing a camera comprising the steps of:
   aiming the camera at a given scene;
   measuring the rotational eye position of a cameraman as he views a given portion of said scene to generate an eye position signal representative of said measured eye position;
   controlling an autofocus device so that it is aimed at said given portion of the scene; and
   controlling the lens focus with said autofocus device responsive to said eye-position signal.

10. The method of claim 9 further comprising self-calibrating the camera by the cameraman including the steps of:
   displaying a calibrating image to the cameraman on a video monitor;
   providing a calibrating eye position of a cameraman with an eye movement monitoring apparatus;
   displaying on said monitor (the measured) said calibrating eye position of the cameraman as he looks at said calibrating image;
   and adjusting (the) said eye movement monitoring apparatus until the displayed calibrating eye (movement signal) position overlaps said calibrating image on the monitor.

* * * * *